United States Patent
Przybyla et al.

(10) Patent No.: US 10,700,792 B2
(45) Date of Patent: Jun. 30, 2020

(54) PROGRAMMABLE ULTRASONIC TRANSCEIVER

(71) Applicant: Chirp Microsystems, Inc., Berkeley, CA (US)

(72) Inventors: Richard Przybyla, Berkeley, CA (US); Mitchell Kline, Berkeley, CA (US); David Horsley, Berkeley, CA (US)

(73) Assignee: CHIRP MICROSYSTEMS, INC., Berkeley, CA (US)

( * ) Notice: Subject to any disclaimer, the term of this patent is extended or adjusted under 35 U.S.C. 154(b) by 183 days.

(21) Appl. No.: 15/920,300

(22) Filed: Mar. 13, 2018

(65) Prior Publication Data
US 2019/0089468 A1    Mar. 21, 2019

Related U.S. Application Data

(63) Continuation of application No. PCT/US2016/052124, filed on Sep. 16, 2016.
(Continued)

(51) Int. Cl.
*H04L 29/00* (2006.01)
*H04B 11/00* (2006.01)
(Continued)

(52) U.S. Cl.
CPC ............ *H04B 11/00* (2013.01); *B06B 1/0207* (2013.01); *G01S 7/523* (2013.01); *G06F 8/65* (2013.01);
(Continued)

(58) Field of Classification Search
CPC . A61B 8/5207; A61B 8/4488; G01S 15/8915; G01S 7/52034; B06B 1/02
See application file for complete search history.

(56) References Cited

U.S. PATENT DOCUMENTS

| 4,868,476 A | 9/1989 | Respaut |
| 5,493,911 A | 2/1996 | Hall et al. |

(Continued)

FOREIGN PATENT DOCUMENTS

WO    2014014968 A1    1/2014

OTHER PUBLICATIONS

International Search Report dated Jan. 26, 2017 for International Patent Application No. PCT/US2016/052124.
(Continued)

*Primary Examiner* — Ghazal B Shehni
(74) *Attorney, Agent, or Firm* — JDI Patent; Joshua D. Isenberg; Robert Pullman

(57) ABSTRACT

An ultrasonic transceiver system includes a transmitter block, a receiver block, a state machine, a computer unit. The transmitter block contains circuitry configured to drive an ultrasound transducer. The receiver block contains circuitry configured to receive signals from the ultrasound transducer and convert the signals into digital data. The state machine is coupled to the transmitter and receiver blocks and contains circuitry configured to act as a controller for those blocks. The computing unit is coupled to the transmitter block, the receiver block, and the state machine and is configured to drive the transmitter block and process data received from the receiver block by executing instructions of a program. The program memory is coupled to the computing unit and is configured to store the program. The computing unit is configured to be reprogrammed with one or more additional programs stored in the program memory.

20 Claims, 4 Drawing Sheets

Related U.S. Application Data

(60) Provisional application No. 62/220,863, filed on Sep. 18, 2015.

(51) Int. Cl.

| | | |
|---|---|---|
| *B06B 1/02* | (2006.01) | |
| *G01S 7/523* | (2006.01) | |
| *G06F 8/65* | (2018.01) | |
| *H04L 9/08* | (2006.01) | |
| *H04L 9/30* | (2006.01) | |
| *H04L 29/08* | (2006.01) | |
| *H04W 12/02* | (2009.01) | |
| *H04L 27/34* | (2006.01) | |
| *H04W 88/02* | (2009.01) | |

(52) U.S. Cl.
CPC .............. *H04L 9/0869* (2013.01); *H04L 9/30* (2013.01); *H04L 67/34* (2013.01); *H04L 9/0861* (2013.01); *H04L 27/34* (2013.01); *H04W 12/02* (2013.01); *H04W 88/02* (2013.01)

(56) References Cited

U.S. PATENT DOCUMENTS

| | | | |
|---|---|---|---|
| 5,696,828 | A | 12/1997 | Koopman, Jr. |
| 6,607,136 | B1* | 8/2003 | Atsmon ................ G06F 21/34 |
| | | | 235/487 |
| 8,855,303 | B1 | 10/2014 | Glatfelter et al. |
| 2007/0116293 | A1 | 5/2007 | Busser et al. |
| 2009/0046859 | A1 | 2/2009 | Bichler et al. |
| 2012/0051187 | A1 | 3/2012 | Paulson |
| 2013/0104658 | A1 | 5/2013 | Amemiya et al. |
| 2013/0171930 | A1 | 7/2013 | Anand et al. |
| 2014/0050321 | A1* | 2/2014 | Albert ................ H04W 12/04 |
| | | | 380/270 |
| 2014/0051984 | A1* | 2/2014 | Berger ................ A61B 8/546 |
| | | | 600/424 |
| 2014/0108780 | A1 | 4/2014 | Jin et al. |
| 2015/0176399 | A1 | 6/2015 | Scarton et al. |
| 2015/0262569 | A1* | 9/2015 | Dabak ................ G01R 31/00 |
| | | | 367/140 |

OTHER PUBLICATIONS

U.S. Appl. No. 62/220,863 to Richard Przybyla et al. filed Sep. 18, 2015.

Alfred J. Menezes et al: "Chapter 5: Pseudorandom Bits and Sequences" In: Handbook of Applied Cryptography; Jan. 1, 1997(Jan. 1, 1997), CRC Press, Boca Raton, FL, XP055044369, pp. 169-190.

Partial Search Report dated Apr. 4, 2019 for European Patent Application No. 16847378.3.

Supplementary European Search Report dated Sep. 25, 2019 for application 16847378.3.

* cited by examiner

PROGRAMMABLE ULTRASONIC TRANSCEIVER

CLAIM OF PRIORITY

This application is a continuation of International Patent Application Number PCT/US2016/05124 filed Sep. 16, 2016, the entire disclosures of which are incorporated herein by reference. International Patent Application Number PCT/US2016/05124 claims the priority benefit of U.S. Provisional Patent Application Ser. No. 62/220,863 filed Sep. 18, 2015, the entire disclosures of which are incorporated herein by reference.

STATEMENT REGARDING FEDERALLY SPONSORED RESEARCH OR DEVELOPMENT

This invention was made with Government support under IIP-1456376 awarded by the National Science Foundation. The Government has certain rights in this invention. 45 CFR 650.4(f)(4)

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE DISCLOSURE

The present disclosure is related to ultrasonic transceivers and more particularly to programmable ultrasound transceivers.

BACKGROUND

Ultrasonic transducers can be used for a variety of applications. These for example include proximity detection, one-dimensional rangefinding, three dimensional triangulation, data transmission, and public key transmission.

In each application, some common aspects can be shared, such as the ultrasound transducer, transmit circuitry, and receive circuitry. Other aspects are different, such as the signal processing and protocol of the transmitted and received waves.

Currently, to enable different applications a different hardware system must be designed which is a long and expensive process. What is needed is a system which can support several applications without redesign of the hardware system.

One application of ultrasound is public key cryptography. In public key cryptography, a public key and a private key are generated for each user. A user wishing to establish a private link with a second user transmits the first user's public key to the second user. The second user uses the first user's public key to encrypt the second user's key and send it back to the first user. The first user can then use the second user's key to encrypt the message the first user wishes to send to the second user.

The limitations of this process are in the key generation step and the initial exchange of key step. In the key generation step, a code is generated using a random or pseudorandom process. It is necessary that the key generation process generates enough randomness that the probability distribution function of the generated keys is uniform. If only a limited subset of keys is generated from the code generation process, the key can be guessed by those parties with prior knowledge of the probability distribution function. What is needed is a process which reliably generates random bits which can be used to generate truly random keys.

In the initial exchange of keys between two users, a third user with access to the infrastructure on which the keys are exchanged can insert themselves with a man-in-the-middle attack. In such an attack, the public keys of each of the first two users are replaced during transit with the key(s) of the attacking party. The two users do not know that they are not communicating directly. What is needed is a way to exchange keys using a medium of transfer which is not easily susceptible to monitoring by a third party.

BRIEF SUMMARY

According to aspects of the present disclosure, an ultrasonic transceiver system may include the following elements: a transmitter block containing circuitry configured to drive an ultrasound transducer; receiver block containing circuitry configured to receive signals from the ultrasound transducer and convert the signals into digital data; a state machine coupled to the transmitter block and the receiver block, wherein the state machine contains circuitry configured to act as a controller for the transmitter and receiver blocks; a computing unit coupled to the transmitter block, the receiver block, and the state machine, a program memory coupled to the computing unit configured to store the program.

The computing unit is configured to drive the transmitter block and process data received from the receiver block by executing instructions of a program. The computing unit is also configured to be reprogrammed with one or more additional programs stored in the program memory.

In some implementations, the system may further include the ultrasound transducer.

In some implementations, the transmitter block, receiver block, state machine, computing unit, program memory may be contained in a single integrated circuit, and ultrasound transducer (if present) may be mounted to a common circuit board or part of a common integrated circuit.

In some implementations, the system may include one or more clocks coupled to the transmitter block, receiver block, state machine, or computing unit.

In some implementations, the system may include a buffer controlled by the state machine. In certain of these implementations, the buffer may contain a command queue.

In some implementations, the computing unit may be configured to update firmware stored in the program memory in response to instructions and/or data from a host processor.

In some implementations, the transmitter block, receiver block, state machine, computing unit, program memory and host processor are part of a common device. In some of these implementations, the common device may be a cell phone, a tablet, a computing device, a robot, a television, or a proximity detector.

In some implementations, the system may further include a digital interface coupled to the computing unit. In some subset of these implementations, but not all, the computing unit may be configured to update firmware stored in the program memory in response to instructions and/or data received via the digital interface from a host microprocessor. In implementations of the subset, wherein the ultrasound processor is configured to reprogram the system for different functions by updating the firmware stored in the program memory in response to the instructions and/or data received from the host processor via the digital interface.

In some implementations, the computing unit may be configured to update firmware stored in the program memory in response to instructions and/or data from a host processor received via the ultrasound transducer and receiver block.

In some implementations, the computing unit may be configured to cause the host processor to update the computing unit's firmware stored in the program memory in response to a change in the impulse response of the ultrasound channel which may for example indicate the presence, absence, or motion of a nearby object.

In some implementations, the system may further include a digital interface coupled to the computing unit, wherein the computing unit may be configured to update firmware stored in the program memory in response to instructions and/or data from a host processor via a network to the host microprocessor coupled to the digital interface.

In some implementations, the transmitter circuitry block may include a quadrature amplitude modulation circuit.

In some implementations, the system may include a public key encryption submodule. In a subset of these implementations, the public key encryption submodule may use a random key which is generated from recorded ultrasonic noise. In a subset of the subset, the processor may be configured to record the ultrasonic noise with the receiver block and the ultrasound transducer and to generate the random key from the recorded ultrasonic noise. In some implementations in this subset, the public key may be stored on the device using non-volatile memory. In some implementations, a first system may transmit a first public key to a nearby second system by using the ultrasound transceiver on each system to transmit and receive data through the air. In some implementations, the data may be encoded by phase shift keying, amplitude modulation, or quadrature amplitude modulation. The second system may respond by encrypting a second public key with the first public key and transmitting it back to the first system. The first system may then decrypt the second public key using a first private key which corresponds to the first public key. In each encryption and decryption process, a one-way function may be used, such that when data is encrypted with a public key it can only be decrypted by the private key associated with that public key. After the first system and the second system have exchanged keys using the ultrasonic medium, they may continue to exchange encrypted data over the ultrasonic medium, or they may use a wired or wireless network to communicate privately

DETAILED DESCRIPTION

A programmable ultrasonic transceiver is disclosed. A programmable ultrasonic transceiver includes one or more ultrasonic transducer, transmit and receive circuitry, a reprogrammable processor, one or more memories, and a digital interface. The benefits of the present subject matter include but are not limited to: 1) an ultrasonic transceiver can be used for several applications by updating the processor firmware, 2) the processor firmware memory size can be kept small by loading specialized programs to enable specialized functions, 3) the ultrasonic transceiver firmware can be updated over the internet, enabling remote update of the transceiver functionality.

Figure 1A:
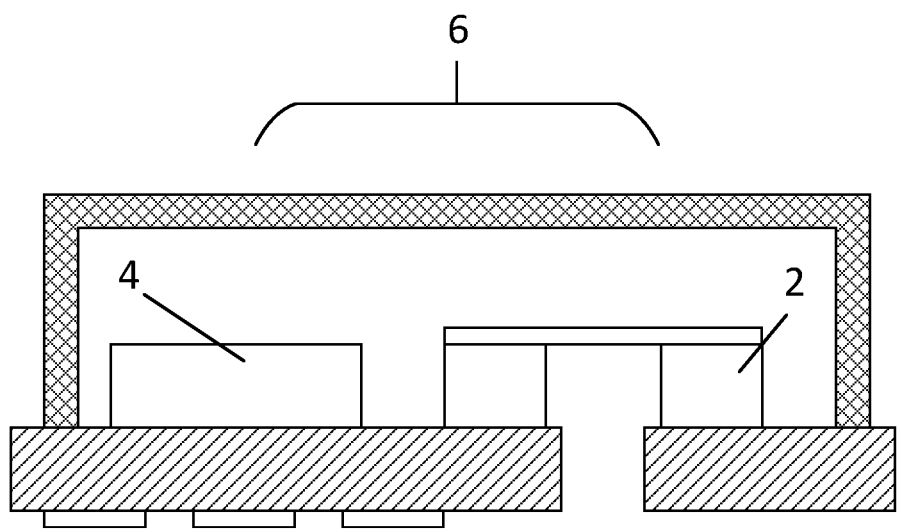
FIG. 1A shows a cross-section view of a programmable ultrasonic transceiver in accordance with an aspect of the present disclosure.
Figure 1B:
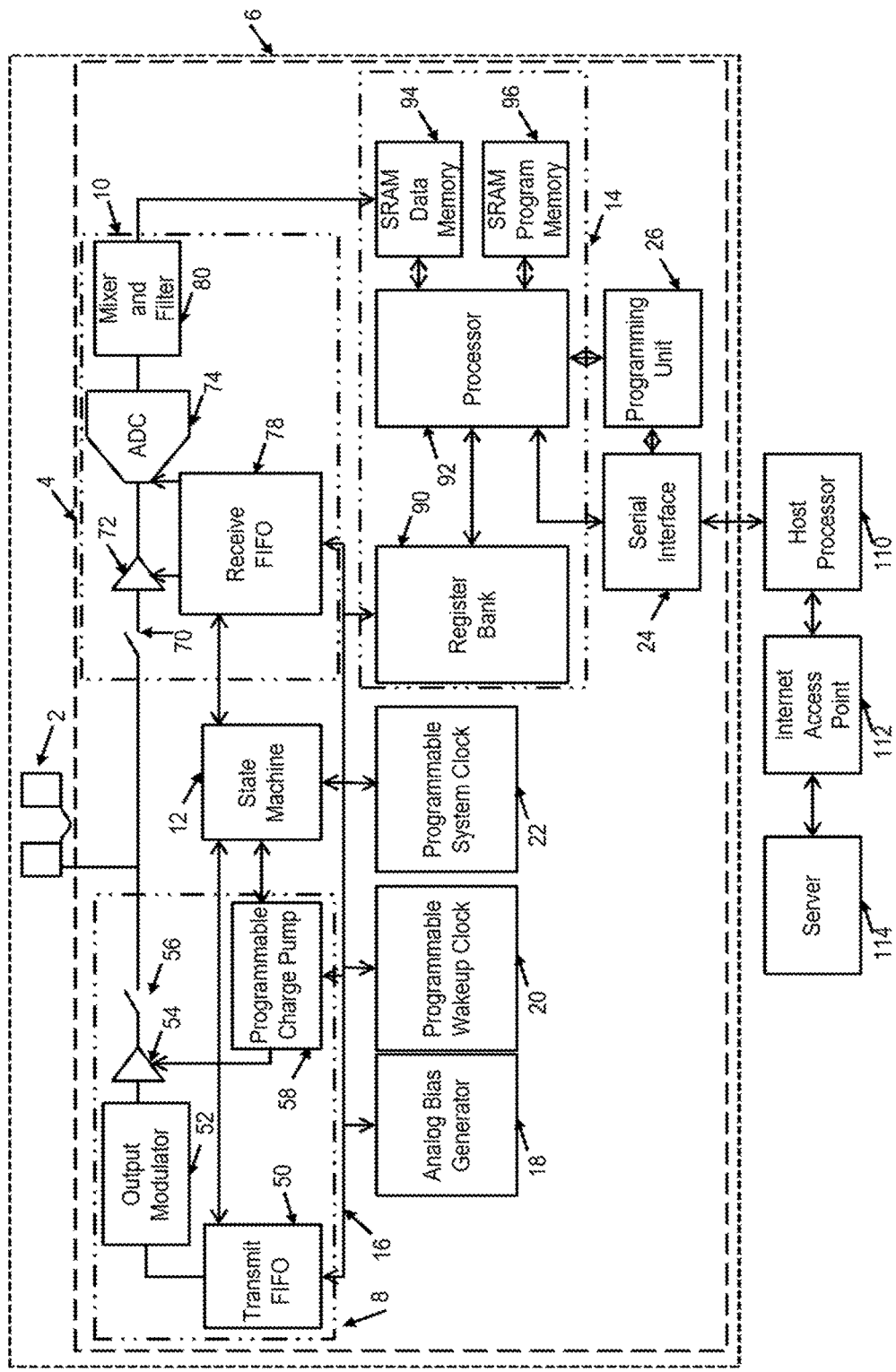
FIG. 1B is a block diagram of a programmable ultrasonic transceiver in accordance with an aspect of the present disclosure.
Figure 2:
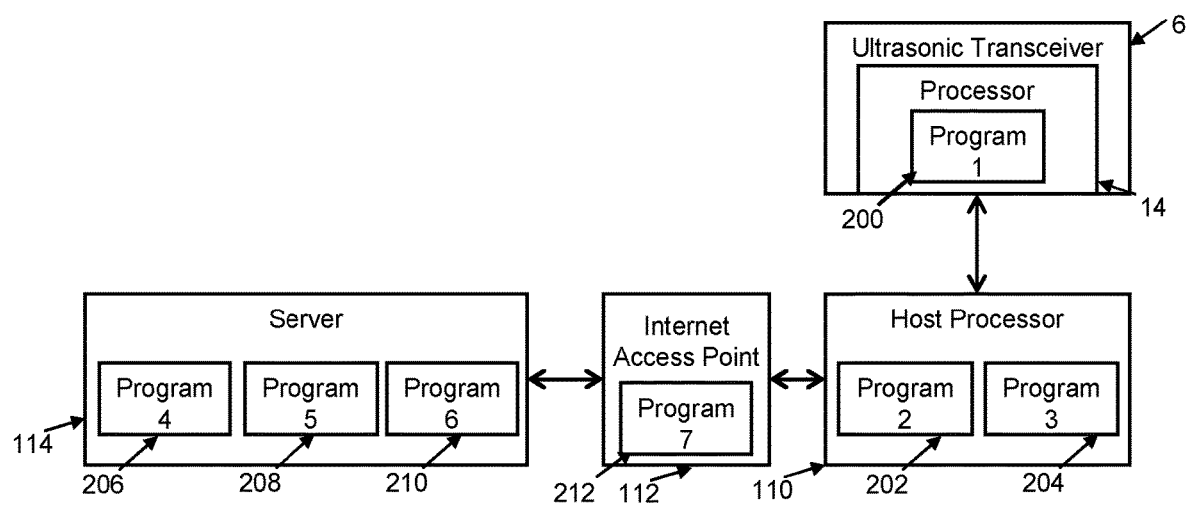
FIG. 2 shows a block diagram illustrating the storage of program code in various locations for a programmable ultrasonic transceiver in accordance with an aspect of the present disclosure.

FIG. 1A, FIG. 1B and FIG. 2 illustrate a possible implementation of an ultrasonic transceiver according to aspects of the present disclosure. Ultrasonic transceiver 6 contains ultrasonic transducer 2 and electronic assembly 4. Ultrasonic transceiver 6 may consist of a packaged assembly which contains electronic ports and one or more acoustic ports. Ultrasonic transducer 2 may consist of a micromachined ultrasound transducer which consists of a membrane formed over a substrate and which may be actuated using piezoelectric, capacitive, or thermal actuation. Electronic assembly 4 may consist of a single integrated circuit or several integrated circuits and may also contain discrete components.

In an embodiment, electronic assembly 4 contains a transmitter block 8, a receiver block 10, a state machine 12, and a central computing unit 14. By way of example, and not by way of limitation, the central computing unit 14 may include an 8051 microcontroller core or an ARM processor core. The electronic assembly 4 may also include a peripheral bus 16, an analog bias generator 18, a programmable wakeup clock 20, a programmable system clock 22, a data interface 24, e.g., a serial interface, and a programming unit 26. In some embodiments, the interface 24 may be a parallel interface or one or more wires carrying a modulated carrier used to encode digital data.

In one embodiment, transmitter block 8 contains a buffer 50 (e.g., first-in-first-out (FIFO)) which holds transmit commands. Each transmit command controls an output modulator 52 which controls the amplitude, phase, and duration of the output signal. Amplifier 54 and transmit switch 56 control the output voltage signal which is applied to ultrasonic transducer 2. A programmable charge pump 58 boosts the input voltage supply level from the input range of 0.5 to 5 volts to the output range of 5 to 60 volts and more specifically from the input range of 1 to 3.3 volts to the output range of 10 to 30 volts.

A receiver block 10 contains a receive switch 70 which blocks the high voltage transmit signal from the low noise receive amplifier 72. A receive buffer 78, e.g., first-in-first-out register (receive FIFO) holds receive commands which control the gain and time constant of the low noise receive amplifier 72 and the analog to digital converter (ADC) 74. In some embodiments, the receive FIFO may be omitted or may be replaced with an indexed register bank. The input signal is amplified and digitized by the low noise amplifier 72 and the ADC 74. The digital output signal is quadrature demodulated and filtered by mixer and filter block 80.

Receiver block 10 and transmitter block 8 are controlled by state machine 12. State machine 12 controls the sequencing of transmission and reception of the signals by controlling transmit buffer 50, output modulator 52, transmit switch 56, receive switch 70, and receive buffer 78. State machine 12 retrieves commands from the transmit buffer 50 and controls the transmitter block 8 to execute them for a duration specified within each command. After each command, the state machine 12 fetches a new command from the transmit buffer 50 until it is empty. Subsequently, state machine 12 retrieves commands from the receive buffer 78 and controls the receiver block 10 to execute them for a duration specified within each command. After each command, the state machine 12 fetches a new command from the receive buffer 78 until it is empty. Finally, state machine 12 signals processor 92 to indicate that it is finished. State machine 12 may implement the programmable duration of each transmit and receive operation by using a digital counter whose output value is compared to a number contained within the transmit or receive command, as explained further below.

Figure 4:
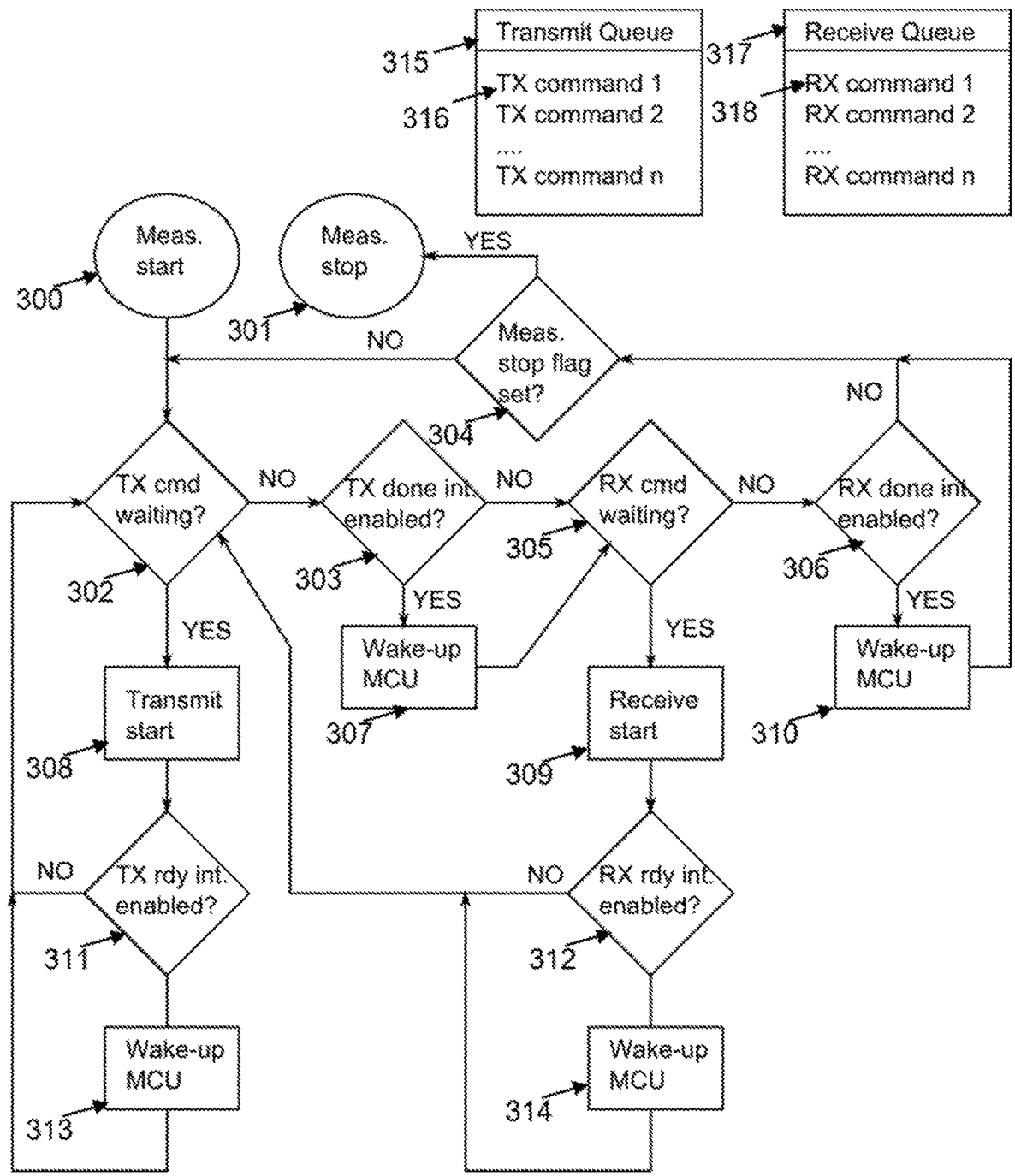
FIG. 4 shows a state diagram illustrating a process for updating a current program of a programmable ultrasonic transceiver in accordance with an aspect of the present disclosure.

Operation of the state machine 12 is shown in detail in FIG. 4. The state machine 12 may be implemented in software as a program executed on a general purpose computer processor (e.g., processor 92) or in hardware as a sequential logic circuit implemented, e.g., on an application specific controller (ASIC), field programmable gate array (FPGA), or system on chip (SoC). The state machine 12 is capable of operating autonomously but occasionally needs interaction from the central computing unit 14. Such interaction will be described in detail where appropriate. Additionally, in the illustrated example, there are transmit and receive command queues 315 and 317 that are shared memory resources between the central computing unit 14 and state machine 12. In one non-limiting implementation, the command queues 315, 317 may be implemented as hardware FIFOs, written by the central computing unit 14 and read by the state machine 12. The FIFOs produce signals indicating that (1) new data is ready or (2) there is space available in the FIFO for a new command.

In the example depicted in FIG. 4, a measurement process is started with the central computing unit 14 issuing a "measurement start" command to the state machine 12. This places the execution flow of the state machine at node 300. The "measurement" terminology used in this example refers to a range measurement, but the state-machine 12 can also be used for transmit-only or receive-only configurations, e.g., for transmitting data from one ultrasonic transceiver to another via ultrasound. After entering the node 300, the execution continues to 302. At this point, if the transmit queue 315 has a new transmit command 316 available, the flow continues to 308, and the transmission corresponding to the new transmit command is started. After starting the transmission, the FIFO implementing the transmit queue 315 has space available for the central computing unit 14 to load a new command. If a special "transmit ready interrupt enable" flag is set at 311, the state machine 12 wakes up the central computing unit 14 via a dedicated hardware interrupt. Whether the interrupt being triggered or not, the flow continues back to 302.

If there are no new transmit commands 316 available in the transmit queue 315, flow continues from 302 to 303. If a special "transmit done interrupt enable" flag is set, the state machine 12 wakes up the central computing unit 14, as indicated at 307 (e.g., with a hardware interrupt). Flow then continues to 305.

At this point, if the receive queue 317 has a new receive command 318 available, the flow continues to 309, and the receive action corresponding to the new command is started. After starting the receiver, the FIFO implementing the receive queue 317 has space available for the central computing unit 14 to load a new receive command 318. If a special "receive ready interrupt enable" flag is set at 312, the state machine 12 wakes up the central computing unit 14, e.g., via a dedicated hardware interrupt. Regardless of the interrupt being triggered or not, the flow continues back to 302.

If there are no new commands available in the transmit queue 315 or the receive queue 317, flow continues to 302 to 303 to 305 to 306. If a special "receive done interrupt enable" flag is set, the state machine 12 wakes up the central computing unit 14, e.g., with a hardware interrupt. Flow then continues to 304.

At 304, if a special "measurement stop flag" is set, the measurement process is terminated. Otherwise, flow continues back to 302.

The transmit queue 315 and receive queue 317 contain information about configuration of the physical hardware of the transmitter block 8 and receiver block 10. By way of example, and not by way of limitation, each transmit command 316 may contain information representing a phase, a length of time for transmission, and an amplitude of a transmit waveform; and, each receive command 318 may contain a length of time to receive as well as a gain of the front-end amplifier 72, and an attenuation setting of a front-end attenuator (not shown).

As mentioned previously, the state machine 12 is largely autonomous, requiring only infrequent interaction from the central computing unit 14. This leads to substantial system power savings. The central computing unit 14 loads commands into the queues 315, 317, sets any number of the "special flags" mentioned above, and then goes to sleep. The state machine 12 can then wake-up the central computing unit 14 when it needs further instructions.

The foregoing description of operation of the state machine 12 is non-limiting. According to aspects of the present disclosure, the state machine 12 may implement other features not shown in FIG. 4. By way of example, and not by way of limitation, an emergency stop flag, if set by the central computing unit 14, may immediately stop the state machine and disable the hardware in the transmitter block 8 and receiver block 10. The flow may then be transferred to node 301.

Referring again to FIG. 1B, receiver block 10 may output complex baseband data which is stored in SRAM data memory 94. Processor 92 shares the SRAM data memory 94 and processes the complex baseband data according to the application requirements. Register bank 90 may contain general purpose registers and general purpose input/output ports. Processor 92 controls peripherals through data bus 16. Processor 24 is interfaced to an external host processor 110 through a serial interface 24 which may consist of a protocol such as serial peripheral interface (SPI), inter integrated circuit (I2C) or another proprietary interface protocol using one or more digital or analog output signals. Serial interface 24 controls programming unit 26 which enables processor 92 to load SRAM program memory 96 through serial interface 24.

Host processor 110 is configured to load the SRAM program memory 96 using the serial interface 24, the programming unit 26, and the processor 92. Ultrasonic transceiver 6 may then transmit and receive ultrasound signals according to the current program.

Referring to FIG. 2, in one embodiment, a program code 200 may be loaded into ultrasonic transceiver 6 which enables a low-power monitoring state of ultrasonic transceiver 6. In this mode, the transceiver may emit ultrasound periodically and subsequently receive any echo signal which returns. If the received echo signal is above a certain threshold, the presence of an object is indicated. The distance to this object is measured by computing the time-of-flight of the ultrasonic signal and dividing by two and multiplying by the speed of sound. The ultrasonic transceiver may also detect the ultrasonic signals emitted by a nearby ultrasonic transceiver. The ultrasonic transceiver 6 program code 200 may be configured to cause ultrasonic transceiver 6 to signal host processor 110 in the event that the measured distance is within certain criteria.

Host processor 110 may subsequently wake from a low power state. Depending on the context of the application running on the host processor, the host processor may load an alternate program 202 or 204 into ultrasonic transceiver 6 to enable a different application. For example, if a first ultrasonic transceiver 6 detects a second ultrasonic transceiver nearby, the host processor 110 may load a data-transfer program 204 into the program memory 96 of ultrasonic transceiver 6. Data transfer may then be accomplished through quadrature amplitude modulation of the ultrasonic signal wherein the number of symbols, their constellation in the IQ plane, and the symbol rate may be determined by the measured state of the ultrasonic channel. A designer skilled in the art will appreciate that many encoding schemes could be used, including phase shift keying, differential phase shift key, binary phase shift keying, frequency modulation, or amplitude modulation.

In one embodiment, host processor 110 may not have an ultrasonic transceiver program code for the desired application stored locally. Host processor 110 may use an internet access point 112 to connect to a remote server 114 to select the desired program code 212 from among other programs 206, 208, 210 and store it in ultrasonic transceiver 6 program memory 96. This process may be facilitated by a user or happen without user input. In one embodiment the program code may be transferred to the host processor in exchange for monetary or other compensation.

In some embodiments, the electronic assembly may be configured to cause the host processor 110 to update firmware stored in the program memory 96 in response to a change in impulse response of an ultrasonic channel. By way of example, and not by way of limitation, a change in impulse response may result from a change in the range of a nearby object. In such cases, it may be desirable to update the firmware in order to e.g. track the object more accurately using more advanced signal processing that is not normally stored in the program memory 96, e.g., because of limitations on available memory space.

In a further embodiment, ultrasonic transceiver 6 may be used as a cryptographically secure pseudo random number generator. In one embodiment, the ultrasonic transceiver 6 is configured to receive ultrasound, demodulate it, and store it in data memory 94. Processor 92 may be configured to record ultrasonic noise and use it to generate an encryption key.

Figure 3:
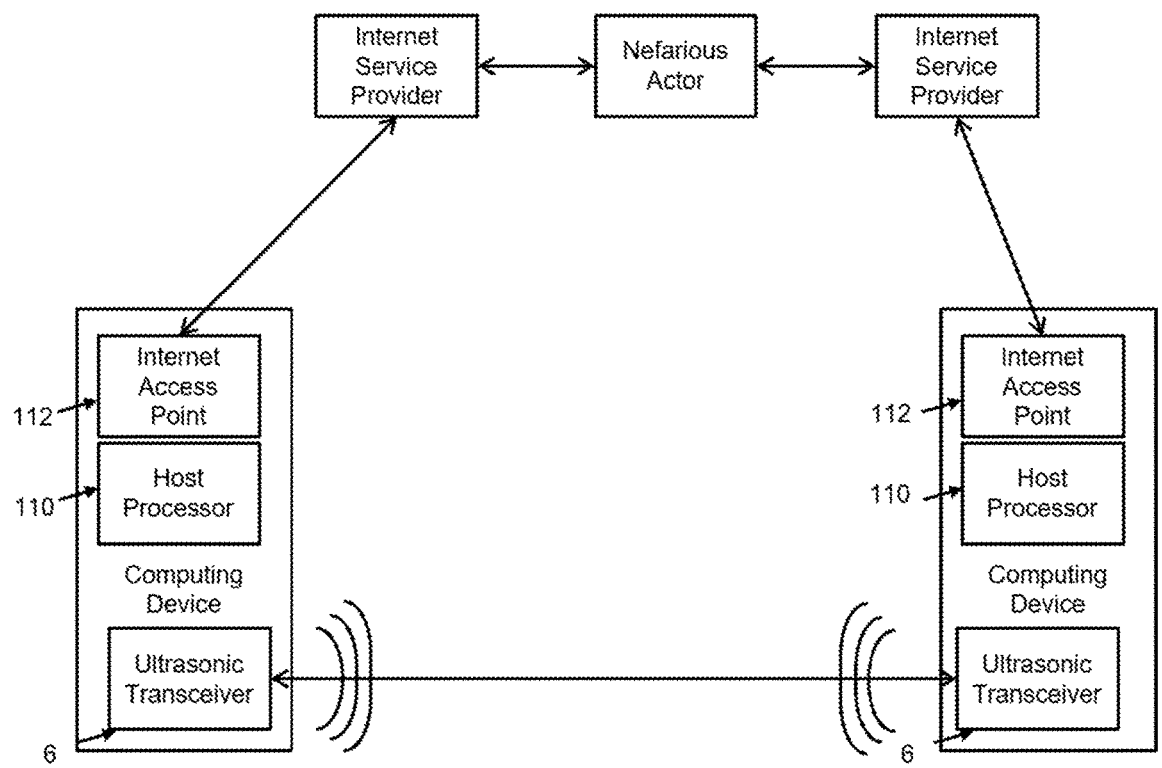
FIG. 3 is a schematic diagram illustrating exchange of encryption keys for secure communication between two devices according to an aspect of the present disclosure.

In some implementations, the ultrasonic transceiver 6 may be configured to send an encryption key privately through the ultrasound transducer 2 to another similarly configured transceiver on a device located in reasonably close proximity to the transceiver 6, e.g., in the same room. The other device may similarly send an encryption key to the transceiver 6. Once encryption keys are exchanged, the devices can communicate through the internet without being susceptible to a man in the middle attack by a nefarious actor as illustrated in FIG. 3. The advantage of such an implementation is that ultrasound does not travel very far or go through walls, which reduces the likelihood of interception of an encryption key by the nefarious actor.

All cited references are incorporated herein by reference in their entirety. In addition to any other claims, the applicant(s)/inventor(s) claim each and every embodiment of the invention described herein, as well as any aspect, component, or element of any embodiment described herein, and any combination of aspects, components or elements of any embodiment described herein.

The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC § 112(f). In particular, the use of "step of" in the claims herein is not intended to invoke the provisions of 35 USC § 112(f).

What is claimed is:

1. An ultrasonic transceiver system, comprising:
a transmitter block containing circuitry configured to drive an ultrasound transducer;
receiver block containing circuitry configured to receive signals from the ultrasound transducer and convert the signals into digital data;
a state machine coupled to the transmitter block and the receiver block, wherein the state machine contains circuitry configured to act as a controller for the transmitter and receiver blocks;
a computing unit coupled to the transmitter block, the receiver block, and the state machine,
wherein the computing unit is configured to drive the transmitter block and process data received from the receiver block by executing instructions of a program,
a program memory coupled to the computing unit configured to store the program;
a public key encryption submodule, wherein the public key encryption submodule uses a random encryption key generated from recorded ultrasonic noise; and
a digital interface coupled to a the computing unit,
wherein the system is configured to send a first encryption key ultrasonically to a second system with the ultrasound transducer, and receive a second encryption key ultrasonically from the second device with the ultrasound transducer and wherein the system is configured to use the first and second encryption keys to communicate securely between the system and the second system through a network coupled to the digital interface.

2. The system of claim 1, wherein the computing unit is configured to be reprogrammed with one or more additional programs stored in the program memory.

3. The system of claim 1, further comprising the ultrasound transducer.

4. The system of claim 3, wherein the transmitter block, the receiver block, the state machine, the computing unit, and the program memory are mounted to a common circuit board.

5. The system of claim 3, wherein the transmitter block, the receiver block, the state machine, the computing unit, and the program memory are part of a common integrated circuit.

6. The system of claim 1, further comprising one or more clocks coupled to the transmitter block, the receiver block, the state machine, or the computing unit.

7. The system of claim 1, where the transmitter block and/or the receiver block includes a buffer controlled by the state machine.

8. The system of claim 7, wherein the buffer contains a command queue.

9. The system of claim 1, wherein the computing unit is configured to update firmware stored in the program memory in response to instructions and/or data from a host processor.

10. The system of claim 1, wherein the transmitter block, the receiver block, the state machine, the computing unit, the program memory and the host processor are part of a common device.

11. The system of claim 10, wherein the common device is a cell phone.

12. The system of claim 1, further comprising a digital interface coupled to the computing unit.

13. The system of claim 12, wherein the computing unit is configured to update firmware stored in the program memory in response to instructions and/or data received from a host processor via the digital interface.

14. The system of claim 13, wherein the computing unit is configured to reprogram the system for different functions by updating the firmware stored in the program memory in response to the instructions and/or data received from the host processor via the digital interface.

15. The system of claim 1, wherein the computing unit is configured to update firmware stored in the program memory in response to instructions and/or data received from a host processor via the ultrasound transducer and receiver block.

16. The system of claim 1, further comprising a digital interface coupled to the computing unit, wherein the computing unit is configured to update firmware stored in the program memory in response to instructions and/or data from a host processor via a network coupled to the digital interface.

17. The system of claim 1, wherein the transmitter block includes a quadrature amplitude modulation circuit.

18. The system of claim 1, wherein the computing unit is configured record the ultrasonic noise with the receiver block and the ultrasound transducer and to generate the random encryption key from the recorded ultrasonic noise.

19. The system of claim 1, wherein the random encryption key is stored by the system in a non-volatile memory.

20. The system of claim 1, further comprising a digital interface coupled to the computing unit, wherein the computing unit is configured to cause a host processor to update firmware stored in the program memory in response to a change in impulse response of an ultrasonic channel.

* * * * *